(12) United States Patent
Abbiati et al.

(10) Patent No.: US 11,320,617 B2
(45) Date of Patent: May 3, 2022

(54) CONNECTION BOX AND METHOD FOR CONNECTING OPTICAL CABLES

(71) Applicant: Prysmian S.p.A., Milan (IT)

(72) Inventors: Fabio Abbiati, Milan (IT); Gianluigi Radaelli, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/761,627

(22) PCT Filed: Nov. 23, 2017

(86) PCT No.: PCT/IT2017/000262
§ 371 (c)(1),
(2) Date: May 5, 2020

(87) PCT Pub. No.: WO2019/102500
PCT Pub. Date: May 31, 2019

(65) Prior Publication Data
US 2021/0149141 A1 May 20, 2021

(51) Int. Cl.
*G02B 6/44* (2006.01)
(52) U.S. Cl.
CPC ......... *G02B 6/4454* (2013.01); *G02B 6/4447* (2013.01); *G02B 6/4452* (2013.01)
(58) Field of Classification Search
None
See application file for complete search history.

(56) References Cited

U.S. PATENT DOCUMENTS

| | | | |
|---|---|---|---|
| 4,702,551 A | 10/1987 | Coulombe | |
| 4,805,979 A * | 2/1989 | Bossard | G02B 6/4446 385/135 |
| 6,621,975 B2 * | 9/2003 | Laporte | G02B 6/445 385/135 |
| 2002/0181925 A1 * | 12/2002 | Hodge | G02B 6/483 385/135 |
| 2008/0170832 A1 * | 7/2008 | Mullaney | G02B 6/4477 385/135 |
| 2009/0252462 A1 * | 10/2009 | Bonical | G02B 6/4454 385/96 |

(Continued)

FOREIGN PATENT DOCUMENTS

EP 2108987 A1 10/2009
EP 2166389 A1 3/2010

*Primary Examiner* — Michael Stahl
(74) *Attorney, Agent, or Firm* — Slater Matsil, LLP (57) ABSTRACT

It is disclosed a connection box for housing a connection between a distribution cable and a drop cable of an optical access network. The connection box comprises an outer casing and a detachable connection plate, which may be completely housed therein. The outer casing comprises a fixing member for fixing the distribution cable. The connection plate comprises a first surface with a fixing member for fixing an end of the drop cable and a second, opposite surface with a connector holder for holding the optical connector between a distribution fiber extracted from the distribution cable and a drop fiber extracted from the drop cable. The perimeter edge of the connection plate exhibits an indentation forming a fiber passage allowing the drop fiber passing from the first surface to the second surface of the connection plate. It is also disclosed a method for connecting two optical cables using such connection box.

22 Claims, 7 Drawing Sheets

(56) References Cited

U.S. PATENT DOCUMENTS

| | | | |
|---|---|---|---|
| 2011/0164853 A1* | 7/2011 | Corbille | G02B 6/445 385/135 |
| 2013/0236150 A1* | 9/2013 | Kopf | G02B 6/4401 385/135 |
| 2014/0023334 A1* | 1/2014 | Larsson | G02B 6/4446 385/135 |
| 2015/0117829 A1 | 4/2015 | Allen | |
| 2015/0346449 A1* | 12/2015 | Clatanoff | G02B 6/4455 385/135 |

* cited by examiner

CONNECTION BOX AND METHOD FOR CONNECTING OPTICAL CABLES

CROSS-REFERENCE TO RELATED APPLICATIONS

This application is a national stage of International Application No. PCT/IT2017/000262, filed on Nov. 23, 2017, which application is hereby incorporated herein by reference in its entirety.

TECHNICAL FIELD

The present invention relates to the field of optical access networks. In particular, the present invention relates to a connection box for connecting optical cables.

BACKGROUND

An FTTH (Fiber To The Home) network is an optical access network providing a number of end users with communication services, e.g. with services requiring data transmission at a rate of some hundreds of Mbit/s or more.

Typically, an FTTH network comprises a distribution cabinet cooperating with a transport network and a number of optical cables (namely, cables comprising optical fibers) which connect the distribution cabinet with termination boxes arranged at the various user's premises. In particular, an optical cable comprising multiple optical fibers typically exits the distribution cabinet and runs through an area (e.g. a residential area) where the houses of different end users are placed. Such optical cable will be termed herein after "distribution cable" and the optical fibers comprised therein will be termed "distribution fibers."

The distribution cable may be either laid down in underground ducts running besides the houses or, alternatively, it may be horizontally fixed to the houses' façades. In the latter case, the deployment of the FTTH network requires using cables and other components which exhibit high resistance to stresses typical of outdoor environments and which are effectively sealed against seepage and dust infiltrations.

In order to connect the termination box of an end user to the distribution cable, an optical cable called "drop cable" is typically used. The drop cable may comprise one or more optical fibers (up to 4, typically), which are termed herein after "drop fibers".

For connecting the drop cable of an end user to the distribution cable, a first window is typically cut in the external sheath of the distribution cable at a first mid-span position thereof and then one or more distribution fibers (depending on the number of drop fibers of the drop cable) are cut through this first window. Then, a second window (also termed "tapping window") is cut in the external sheath of the distribution cable at a second mid-span position thereof, intermediate between the distribution cable end connected to the distribution cabinet and the first window, possibly on the façade of the house where the end user resides. The cut distribution fiber(s) is then drawn through the tapping window and connected (e.g. by means of mechanical splice(s) or fusion splice(s)) to the drop fiber(s).

Both the first window and the tapping window cut in the external sheath of the distribution cable are typically protected against seepage and dust infiltration by suitable boxes fixed to the distribution cable. The box protecting the tapping window also typically has the function of housing the optical connector(s) (mechanical splice(s) or fusion splice(s)) between distribution fiber(s) and drop fiber(s) and any extra-length of the fibers, and is therefore termed herein after also "connection box".

EP 2 108 987 describes an optical box for housing the connection between one or more optical fibers extracted from a distribution cable and one or more optical fibers extracted from a subscriber cable. The box comprises a first part having a rectangular base, two opposite sidewalls and means for being fastened to the distribution cable (e.g. clamp collars or adhesive strips). A second part of the box comprises two rectangular cassettes reciprocally hinged, the first cassette having an opening for the passage of fibers and the second cassette having splices or connectors. In order to make the connection, a fiber is extracted from the distribution cable through a tapping window cut in the cable sheath, and then the distribution cable is fixed to the first part of the box. Also the subscriber cable may be fixed to the first part of the box. The fiber from the distribution cable and the fiber from the subscriber cable are passed through the opening in the first cassette of the second part of the box. Then, the fibers are connected (e.g. spliced) and then the operator fastens the second part of the box to the first part. The fibers are then coiled and arranged in the first cassette of the second part of the box. The second part of the box is finally closed.

SUMMARY

In one embodiment, a connection box comprises an outer casing comprising a first fixing member configured to fix a first optical cable to the outer casing at a mid-span position and a connection plate detachable from the outer casing and configured to be completely housed within the outer casing. The connection plate comprises a first surface comprising a second fixing member configured to fix an end of a second optical cable to the connection plate, and a second surface opposite to the first surface. The second surface comprises a connector holder configured to hold an optical connector between a first optical fiber extracted from the first optical cable at the mid-span position and a second optical fiber extracted from the end of the second optical cable. The connection plate further comprises a perimeter edge exhibiting an indentation which forms a fiber passage configured to allow passage of the second optical fiber from the first surface to the second surface of the connection plate. The connection box is configured to house a connection between the first optical cable and the second optical cable at the mid-span position of the first optical cable.

In an embodiment, a method for connecting a first optical cable and a second optical cable at a mid-span position of the first optical cable includes extracting a first optical fiber from the first optical cable at the mid-span position and fixing the first optical cable to an outer casing of a connection box at the mid-span position. The method further includes fixing an end of the second optical cable to a first surface of a connection plate of the connection box, the connection plate being detached from the outer casing. The method further includes making a second optical fiber extracted from the end of the second optical cable pass from the first surface of the connection plate to a second, opposite surface of the connection plate through a fiber passage formed by an indentation of a perimeter edge of the connection plate and completely housing the connection plate in the outer casing of the connection box. The method further includes connecting the first optical fiber extracted from the first optical cable to the second optical fiber extracted from the end of the second optical cable with an optical connector and arranging the optical connector on the second surface of the connection plate.

In an embodiment, an assembly includes a first optical cable, a second optical cable, and a connection box housing a connection between the first optical cable and the second optical cable at a mid-span position of the first optical cable. The connection box comprises an outer casing comprising a first fixing member configured to fix the first optical cable to the outer casing at the mid-span position; and a connection plate detachable from the outer casing and configured to be completely housed within the outer casing. The connection plate comprises a first surface comprising a second fixing member configured to fix an end of the second optical cable to the connection plate, a second surface opposite to the first surface and comprising a connector holder configured to hold an optical connector between a first optical fiber extracted from the first optical cable at the mid-span position and a second optical fiber extracted from the end of the second optical cable, and a perimeter edge exhibiting an indentation which forms a fiber passage configured to allow passage of the second optical fiber from the first surface to the second surface of the connection plate.

BRIEF DESCRIPTION OF THE DRAWINGS

The present invention will become fully clear by reading the following detailed description, given by way of example and not of limitation, to be read by referring to the accompanying drawings, wherein.

DETAILED DESCRIPTION OF ILLUSTRATIVE EMBODIMENTS

The Applicant has noticed that the optical box of EP 2 108 987 exhibits some drawbacks.

In particular, the operation of connecting the distribution cable and the subscriber cable using this optical box is quite inconvenient for the operator.

The step of making the distribution fiber and subscriber fiber pass through the opening of the second cassette indeed requires a certain manual skill, which less experienced operators typically do not have. Also the step of arranging the extra-length of subscriber fiber and distribution fiber in the second cassette may be difficult and expose the fibers to the risk of being pierced or excessively bent or pressed.

The optical box of EP 2 108 987 is moreover not particularly suitable for being effectively sealed against seepage and dust infiltrations, as required e.g. for façade installation. Such an operation would indeed require providing the box with some additional sealing components, which would disadvantageously increase the complexity and cost of the box. This is particularly undesired if the box is intended for a single end user, who shall bear the entire cost of the box.

In view of the above, the Applicant has tackled the problem of providing a connection box for an optical access network and a method for connecting optical cables of an optical access network which overcome at least one of the aforesaid problems.

In particular, the Applicant has tackled the problem of providing a connection box for housing the connection between two optical cables—in particular, but not exclusively, a distribution cable and a drop cable of an optical access network—which is suitable for façade installation, has a reduced cost and makes the operation of connecting the two optical cables particularly operator-friendly.

The Applicant has also tackled the problem of providing a method for connecting two optical cables—in particular, but not exclusively, a distribution cable and a drop cable of an optical access network—which is particularly operator-friendly.

According to embodiments of the present invention, the above problems are solved by a connection box for housing a connection between a first optical cable (in particular, but not exclusively, the distribution cable of an optical access network) and a second optical cable (in particular, a drop cable of an optical access network) at a mid-span position of the distribution cable, comprising an outer casing and a connection plate detachable from the outer casing and configured to be completely housed therein. The outer casing comprises a first fixing member for fixing the distribution cable to the outer casing at its mid-span position. The connection plate comprises (i) a first surface comprising a second fixing member for fixing an end of the drop cable to the connection plate, (ii) a second surface opposite to the first surface and comprising a connector holder for holding an optical connector between a distribution fiber extracted from the distribution cable at the mid-span position and a drop fiber extracted from the drop cable end and (ii) a perimeter edge exhibiting an indentation which forms a fiber passage allowing passage of the drop fiber from the first surface to the second surface of the connection plate.

In order to connect the distribution cable to the drop cable using such connection box, according to embodiments of the present invention a distribution fiber is firstly extracted from the distribution cable at a mid-span position thereof, and the distribution cable is fixed to the outer casing of the connection box with the connection plate detached therefrom; then, an end of the drop cable is fixed to the first surface of the connection plate. The operator then makes the drop fiber pass from the first surface to the second surface of the connection plate through the fiber passage formed by the indentation of the connection plate perimeter edge, and the connection plate is then housed within the outer casing of the connection box. The operator then connects the distribution fiber with the drop fiber by means of an optical connector. The optical connector is finally arranged in the connection holder provided on the second surface of the connection plate.

The connection box of the invention is suitable for façade installations and, at the same time, has a particularly reduced cost.

In the connection box of the invention, indeed, the components needed to hold the optical connector between drop and distribution fibers (as well as those to guide the drop fiber from the point where it exits the drop cable to the point where the optical connector is held and those for arranging the extra-length of distribution fiber and drop fiber) are provided on the connection plate. The outer casing does not comprise any retaining component, except the fixing member for fixing the distribution cable. Hence, the outer casing may have a particularly simple structure with smooth surfaces (no tabs, protrusions, etc.).

On one hand, this implies that the outer casing can be manufactured (e.g. by plastic molding) at a very reduced cost. Moreover, the connection box may be provided to the operator with the connection plate detached from the outer casing, hence substantially with no assembly cost. The overall cost of the connection box is therefore particularly reduced, which is particularly advantageous, since the connection box is intended for a single end user who entirely bears its cost.

On the other hand, the absence of tabs, protrusions etc. from the outer casing surfaces implies the absence of corresponding holes or apertures which would be inevitably formed during the manufacturing by molding. The absence of any hole or aperture on the surfaces of the outer casing, in combination with the fact that the connection plate in use is completely housed within it, advantageously provides a box which may be easily hermetically sealed against seepage and dust infiltration, and which is therefore suitable for façade installation. If the outer casing comprises a base and cover, a sealing degree equal to IP-44 (International Protection) may be reached by coupling the base to the cover in a hermetic way, with no need to provide any additional sealing component.

Besides, the operation of connecting the drop cable to the distribution cable using this connection box is particularly operator-friendly, so that it may be carried out even by less experienced operators with a minimum risk of damaging the fibers.

In order to bring the drop fiber from the point where it exits the drop cable to the point where the optical connector shall be held, indeed, the operator only has to make the drop fiber pass from the first surface to the second surface of the connection plate through the fiber passage formed by the indentation in the perimeter edge of the connection plate. This is much easier than making the drop fiber pass through perimetrically closed apertures or slits.

As to the distribution fiber, the fiber passage formed by the indentation in the perimeter edge of the connection plate allows to easily pass also this fiber from the distribution cable directly above the second surface of the connection plate, where the connection holder is provided. This operation may be easily done after the connection plate has been already fitted into the outer casing, with no need to make the distribution fiber pass through any perimetrically closed apertures or slits.

According to a first aspect, the present invention provides a connection box for housing a connection between a first optical cable and a second optical cable at a mid-span position of the first optical cable, the connection box comprising: an outer casing comprising a first fixing member configured to fix the first optical cable to the outer casing at the mid-span position; a connection plate detachable from the outer casing and configured to be completely housed within the outer casing, the connection plate comprising: a first surface comprising a second fixing member configured to fix an end of the second optical cable to the connection plate; a second surface opposite to the first surface and comprising a connector holder configured to hold an optical connector between a first optical fiber extracted from the first optical cable at the mid-span position and a second optical fiber extracted from the end of the second optical cable; and a perimeter edge exhibiting an indentation which forms a fiber passage configured to allow passage of the second optical fiber from the first surface to the second surface of the connection plate.

Preferably, the outer casing comprises a base and a cover.

Preferably, the connection plate is configured to be completely housed within the base of the outer casing with the first surface facing the base.

Optionally, the first surface of the connection plate comprises at least one first attaching member configured to attach the connection plate to the outer casing, and the base of the outer casing comprises at least one second attaching member configured to engage with the at least one first attaching member.

According to an advantageous variant, the at least one first attaching member comprises at least one pillar, while the at least one second attaching member comprises at least one hollow cylinder configured to receive the at least one pillar.

Alternatively, the cover is configured to block the connection plate in the base, when the cover is closed onto the base.

Preferably, the first surface of the connection plate comprises two second fixing members configured to fix the end of the second optical cable to the connection plate, the two second fixing members being arranged at two consecutive corners of the connection plate.

Preferably, the first surface of the connection plate comprises at least one guiding wall configured to define two alternative fiber paths running over the first surface, from the second fixing member configure to fix the end of the second optical cable to the connection plate, to the fiber passage formed by the indentation in the perimeter edge of the connection plate.

Preferably, the two alternative paths are configured to guide the second optical fiber so that it reaches the fiber passage from anyone of two opposite directions.

Preferably, the second surface of the connection plate comprises a peripheral area for receiving an extra-length of the first optical fiber and the second optical fiber.

Preferably, the connector holder is arranged in an elevated position above a portion of the peripheral area for receiving the extra-length of the first optical fiber and the second optical fiber.

According to advantageous variants, the outer casing comprises at least one third fixing member configured to fix the second optical cable to the outer casing, when the connection plate with the second optical cable fixed thereto is completely housed within the outer casing.

Preferably, the outer casing is configured to be sealed against seepage and dust infiltration, when in use.

According to a second aspect, the present invention provides a second optical cable and a connection box housing a connection between the first optical cable and the second optical cable at a mid-span position of the first optical cable, wherein the connection box is as set forth above.

According to a third aspect, the present invention provides a method for connecting a first optical cable and a second optical cable at a mid-span position of the first optical cable, the method comprising: a) extracting a first optical fiber from the first optical cable at the mid-span position and fixing the first optical cable to an outer casing of a connection box at the mid-span position; b) fixing an end of the second optical cable to a first surface of a connection plate detached from the outer casing; c) making a second optical fiber extracted from the end of the second optical cable pass from the first surface of the connection plate to a second, opposite surface of the connection plate through a fiber passage formed by an indentation of a perimeter edge of the connection plate and completely housing the connection plate in the outer casing of the connection box; and d) connecting the first optical fiber extracted from the first optical cable to the second optical fiber extracted from the end of the second optical cable by means of an optical connector (8) and arranging the optical connector (8) on the second surface (5b) of the connection plate.

Preferably, step a) comprises fixing the first optical cable to a base of the outer casing.

Preferably, step c) comprises arranging the second optical fiber in anyone of two alternative fiber paths running over the first surface of the connection plate, from the point where the end of the second optical cable is fixed to the connection plate, to the fiber passage formed by the indentation in the perimeter edge of the connection plate.

Preferably, step c) comprises arranging the connection plate with the first surface facing a base of the outer casing.

Preferably, step c) comprises arranging the connection plate with the fiber passage formed by the indentation of the perimeter edge of the connection plate positioned above a tapping window of the first optical cable, though which the first optical fiber is extracted from the first optical cable.

Preferably, step c) comprises bringing the first optical fiber on the second surface of the connection plate housed within the outer casing directly from the tapping window of the first optical cable, through the fiber passage formed by the indentation of the perimeter edge of the connection plate.

Preferably, step d) also comprises arranging an extra-length of the first optical fiber and second optical fiber on the second surface of the connection plate.

Preferably, the method also comprises sealing the connection box against seepage and dust infiltration.

As mentioned above, the connection box according to embodiments of the present invention comprises an outer casing and a connection plate detachable from the outer casing.

Figure 1A:
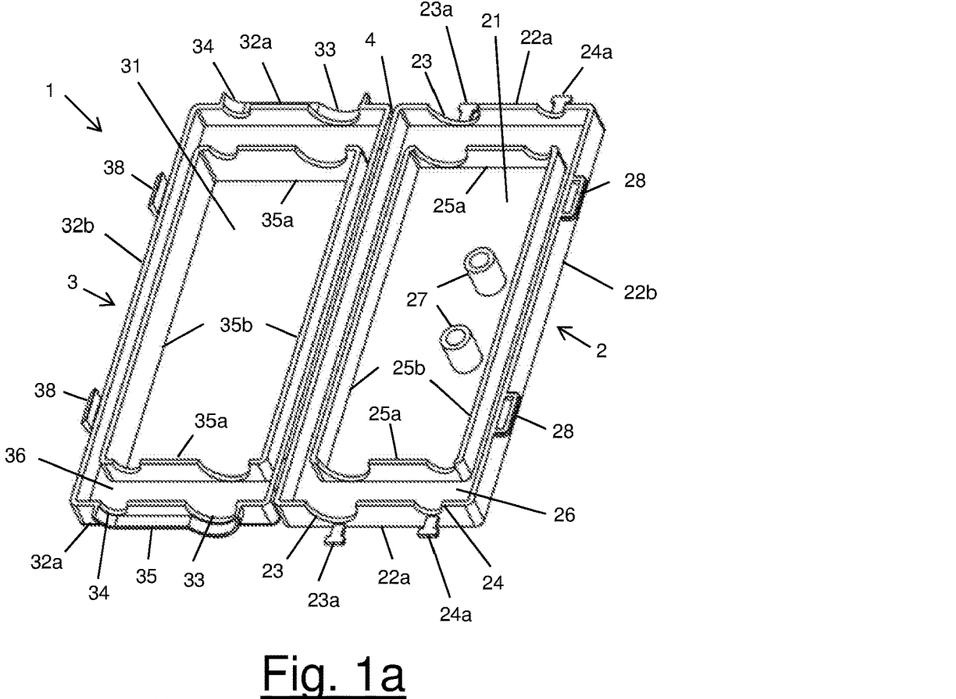
FIGS. 1a and 1b are perspective views of the outer casing of a connection box according to an embodiment of the present invention.
Figure 1B:
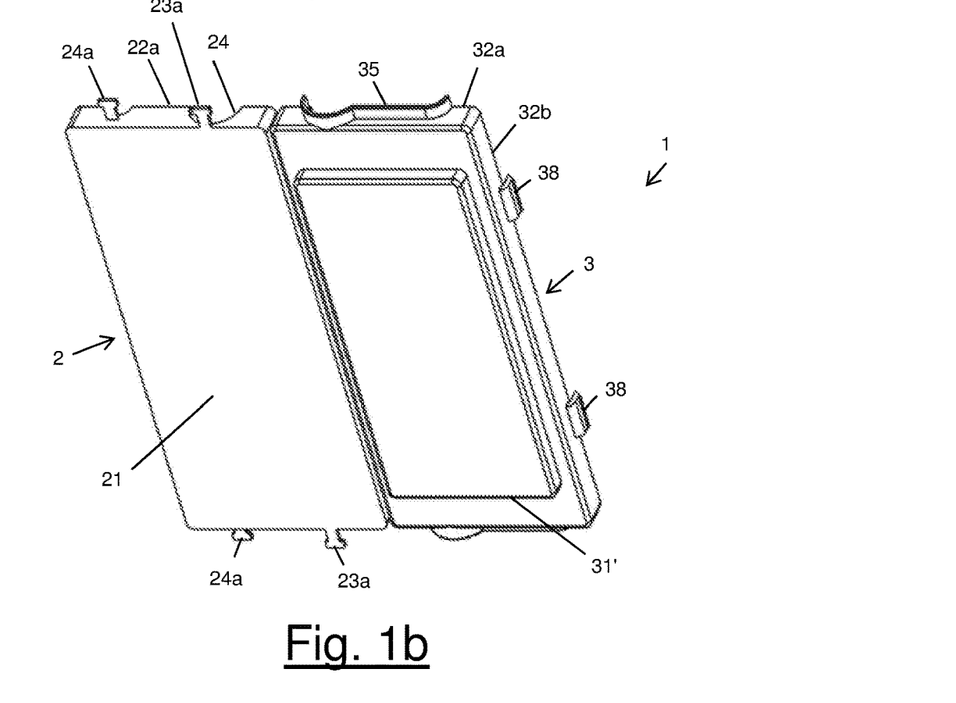

The outer casing 1 according to an embodiment of the present invention is shown in FIGS. 1a and 1b.

The outer casing 1 comprises a base 2 and a cover 3. The base 2 preferably has a substantially rectangular flat bottom 21 and four sidewalls, including two short sidewalls 22a and two long sidewalls 22b.

Each short sidewall 22a exhibits a U-shaped recess 23 configured to allow passage of an optical cable, in particular a distribution cable of an optical access network. At least one of the short sidewalls 22a (preferably both the sidewalls 22a, as shown in the drawings) also exhibits a further U-shaped recess 24 configured to allow passage of an optical cable, in particular a drop cable of an optical access network.

The base 2 is also provided with at least one fixing element 23a configured to fix the optical cable entering and exiting the base 2 through the recesses 23 (namely, the distribution cable) to the outer casing 1. In the embodiment shown in the drawings, such fixing element comprise—for each recess 23—a respective tab protruding 23a towards the exterior of the base 2 in proximity of the recess 23.

The base 2 is also optionally provided with at least one fixing element 24a configured to fix the optical cable entering the base 2 through one of the recesses 24 (namely, the drop cable) to the outer casing 1. In the embodiment shown in the drawings, such means comprise—for each recess 24—a tab 24a protruding towards the exterior of the base 2 in proximity of the recess 24.

The base 2 of the outer casing 1 preferably comprises inner walls 25a, 25b defining—together with the sidewalls 22a, 22b—a perimeter trench 26 suitable for being filled with a sealing material (not shown in the drawings), for the purpose of efficiently sealing the outer casing 1 against seepage and dust infiltration. The sealing material may be e.g. a gel by which the trench 26 is filled upon manufacturing of the outer casing 1, or a preformed sealing member (e.g. a preformed rubber member) conformed to fit in the trench 26. Alternatively, gaskets and/or grommets may be provided for appropriate sealing. The short inner sidewalls 25a preferably comprise U-shaped recesses aligned with the recesses 23 and 24, to allow passage of the distribution cable and drop cable.

The base 2 of the outer casing 1 optionally comprises at least one attaching member 27 configured to attach the connection plate to the base 2. Such at least one attaching member 27 preferably comprise at least one hollow cylinder 27 configured to receive at least one corresponding pillar provided on the connection plate, as it will be described in detail herein after. In the embodiment shown in the drawings, the base 2 comprises two hollow cylinders 27 protruding from the bottom 21 of the base 2. The hollow cylinders 27 are arranged parallel to the long sidewalls 22b of the base 2, preferably substantially aligned with the recesses 24 allowing the passage of the drop cable.

The cover 3 preferably has a ceiling 31 and four sidewalls, including two short sidewalls 32a and two long sidewalls 32b.

Each short sidewall 32a exhibits a U-shaped recess 33 configured to match with the recess 23 in the corresponding sidewall 22a of the base 2, so as to allow passage of the distribution cable. At least one of the short sidewalls 32a (preferably both the sidewalls 32a, as shown in the drawings) also exhibits a further U-shaped recess 34 configured to match with the recess 24 in the corresponding sidewall 22a of the base 2, so as to allow passage of the drop cable.

The U-shaped recesses 33 and 34 on each short sidewall 32a of the cover 3 are preferably protected by a protection winglet 35 protruding from the sidewall 32a toward the exterior of the cover 3.

The cover 3 of the outer casing 1 preferably comprises inner walls 35a, 35b defining—together with the sidewalls 32a, 32b—a perimeter trench 36 filled with a sealing material (e.g. a gel or a rubber, not shown in the drawing) and suitable for matching with the trench 26 in the base 2, so as to form a sealing chamber efficiently sealing the outer casing 1 against seepage and dust infiltration. The short inner sidewalls 35a preferably comprise U-shaped recesses aligned with the recesses 33 and 34, to allow passage of the distribution cable and drop cable.

A central portion 31' of the bottom 31 of the cover 3, which is enclosed by the inner walls 35a, 35b, is preferably lifted relative to the outer portion of the bottom 31, so that the central chamber of the outer casing 1—which is defined by the inner walls 25a, 25b of the base 2 and the inner walls 35a, 35b of the cover 3—has a thickness higher than the surrounding sealing chamber.

The cover 3 is optionally hinged to the base 2, e.g. by means of a life hinge 4. Alternatively, the cover 3 may be detachable from the base 2.

The base 2 preferably comprise first securing members 28 and the cover 3 preferably comprises corresponding second securing members 38 configured to cooperate with the first securing members to secure the cover 3 on the base 2, so as to close the outer casing 1.

The outer casing 1 has a width (namely, a size along the short sidewalls 22a) preferably comprised between 50 mm and 60 mm, more preferably between 55 mm and 58 mm. Further, the outer casing 1 has a length (namely, a size along the long sidewalls 22b) preferably comprised between 140 mm and 160 mm, more preferably between 150 mm and 155 mm. Further, the outer casing 1 has a thickness comprised between 20 mm and 25 mm, more preferably between 22 mm and 25 mm.

Figure 2A:
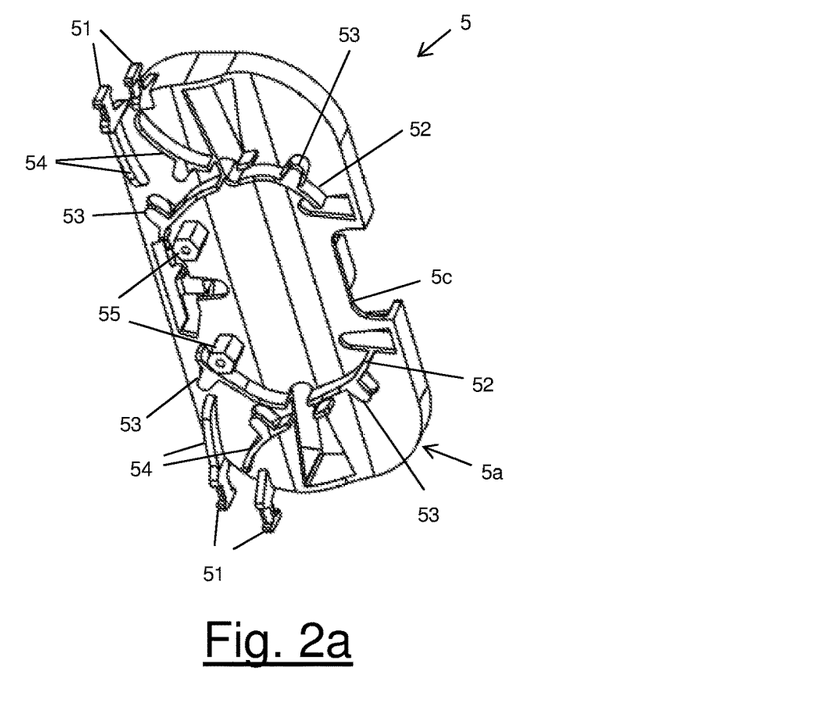
FIGS. 2a and 2b are perspective views of the connection plate of a connection box according to an embodiment of the present invention.
Figure 2B:
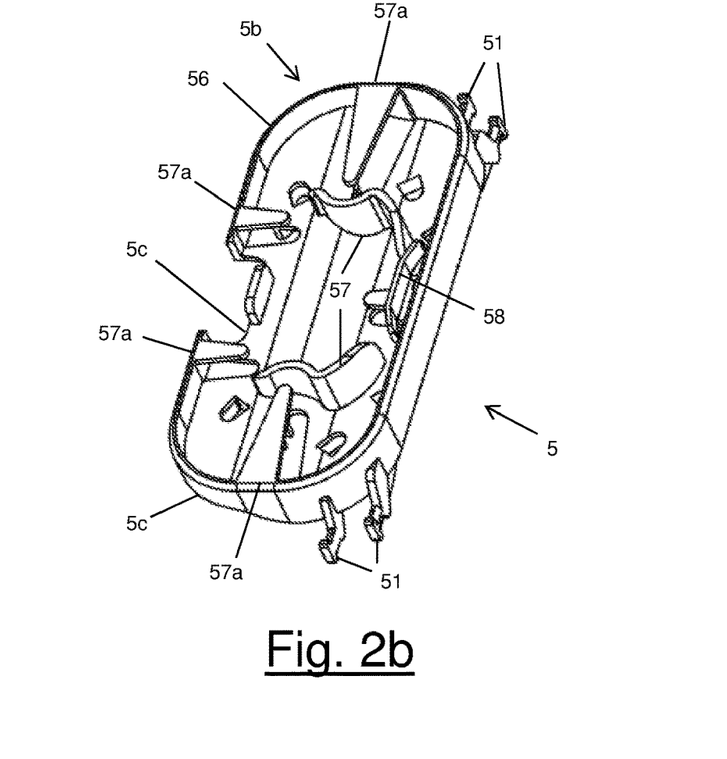

As shown in FIGS. 2a, 2b the connection plate 5 of the connection box is a flat plate having a substantially rectangular shape with rounded corners, and having two opposite surfaces 5a (also termed herein after "first surface" and shown in FIG. 2a) and 5b (also termed herein after "second surface" and shown in FIG. 2b).

The connection plate 5 is configured so that it may be completely housed within the outer casing 1—in particular, within the central chamber defined by the inner walls 25a, 25b of the base 2 and the inner walls 35a, 35b of the cover 3—when the outer casing 1 is closed, namely when the cover 3 is secured to the base 2. The connection plate 5 accordingly has width and length lower than the width and length of the base 2. In particular, the connection plate 5 preferably has width and length lower than the lengths of the inner walls 25a, 25b of the base 2.

The first surface 5a of the connection plate 5 preferably comprises at least one fixing member 51 configured to fix an end of an optical cable, in particular a drop cable of an optical access network, to the connection plate 5. According to the embodiment shown in FIGS. 2a and 2b, such fixing member 51 comprises a pair of protrusions 51 configured to receive optical cables (in particular, drop cables) of different diameters. The protrusions 51 are preferably arranged at a rounded corner of the connection plate 5. More preferably, as shown in FIG. 2a, the first surface 5a of the connection plate 5 comprises two couples of protrusions 51, which are preferably arranged at the two rounded corners adjacent to a same long side of the connection plate 5.

On the first surface 5a of the connection plate 5, preferably, two curved guiding walls 52 are provided. The curved guiding walls 52 are preferably arranged so as to define two curved fiber paths on the first surface 5a of the connection plate 5. Preferably, a number of retaining tabs 53 radially protrude from the upper edge of the curved guiding walls 52 towards the perimeter of the connection plate 5.

Preferably, on the first surface 5a, a couple of directing walls 54 arranged in the shape of "V" is interposed between each couple of protrusions 51 and each curved guiding wall 52.

Preferably, the connection plate 5 comprises on the first surface 5a at least one attaching member 55 configured to cooperate with the at least one attaching member 27 provided on the base 2 of the outer casing 1, to attach the connection plate 5 to the outer casing 1.

Such at least one attaching member 55 preferably comprises at least one pillar configured to be fitted in the at least one hollow cylinder 27 of the base 2. In the embodiment shown in the drawings, two pillars 55 are provided on the first surface 5a of the connection plate 5. The pillars 55 have a hexagonal cross section configured so that the vertexes of the hexagon interfere with the central holes of the hollow cylinders 27, when the pillars 55 are fitted therein. The pillars 55 are preferably arranged along the long side of the connection plate 5 which is adjacent to the rounded corners where the couples of protrusions 51 are arranged.

The attaching members 27 and 55 are optional. According to embodiments not shown in the drawings, the cover 3 may be configured to block the connection plate 5 in the base 2 when it is closed onto the base 2.

The connection plate 5 preferably comprises a perimeter wall 56 projecting from the perimeter edge of the connection plate 5 and surrounding the second surface 5b of the connection plate 5.

The perimeter edge of the connection plate 5 preferably exhibits an indentation 5c that, as it will be described in detail herein after, forms a fiber passage allowing the drop fiber to pass from the first surface 5a to the second surface 5b of the connection plate 5. The indentation 5c is preferably provided at a median position along a long side of the connection plate 5, preferably the long side opposite to that adjacent to the rounded corners where the couples of protrusions 51 are arranged on the first surface 5a.

On the second surface 5b of the connection plate 5, preferably, two curved inner walls 57 are preferably provided which, together with the perimeter wall 56, define on the second surface 5b of the connection plate 5 a peripheral area suitable for arranging an extra-length of the distribution fiber and drop fiber, as it will be described in detail herein after. Fiber retaining tabs 57a preferably radially protrude from the upper edge of the outer wall 56 and extend towards the curved inner walls 57.

The second surface 5b of the connection plate 5 also comprises a connector holder 58 configured to hold an optical connector between distribution fiber and drop fiber, such as a mechanical splice or a fusion splice. The connector holder 58 is configured to keep the optical connector in an elevated position above the second surface 5b, so that the extra-length of the distribution fiber and drop fiber may be arranged also underneath the optical connector, which accordingly acts as a fiber retaining element. This arrangement of the connector holder 58 advantageously allows saving space on the second surface 5b of the connection plate 5. The connector holder 58 is preferably arranged at a median position along a long side of the connection plate 5, preferably along the same long side of the connection plate 5 which is adjacent to the rounded corners where the couples of protrusions 51 are arranged on the first surface 5a.

Figure 4:
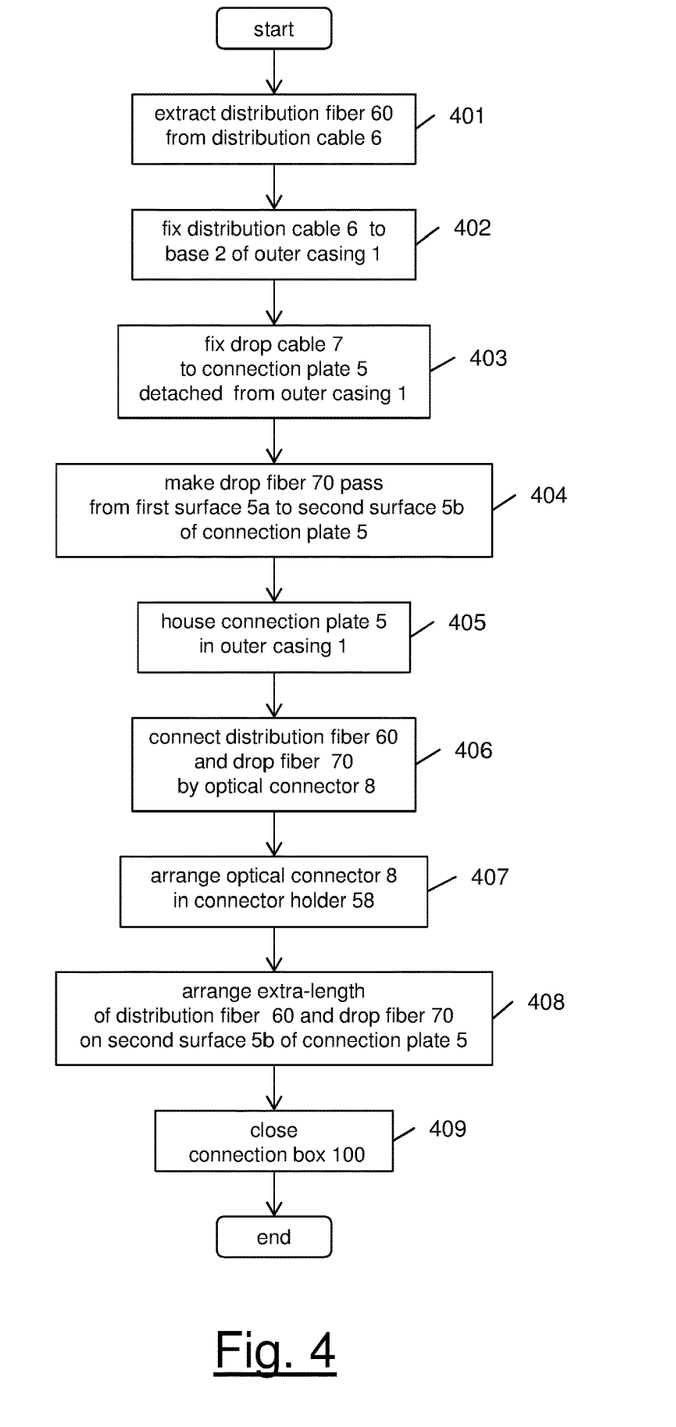
FIG. 4 is a flow chart of the method for connecting two optical cables, in particular a distribution cable and a drop cable of an optical access network, according to an embodiment of the present invention.

The method for connecting two optical cables (in particular, a distribution cable and a drop cable of an optical access network) using a connection box 100 comprising the outer casing 1 and the connection plate 5 will be now described in detail herein after with reference also to the flow chart of FIG. 4.

First of all, the operator extracts a distribution fiber 60 from a distribution cable 6 (step 401).

For this purpose, a first window is cut in the external sheath of the distribution cable 6 at a first mid-span position thereof and then the distribution fiber 60 is cut through this first window. Then, a tapping window 61 is cut in the external sheath of the distribution cable 6 at a second mid-span position thereof, intermediate between the distribution cable end connected to the distribution cabinet and the first window, possibly in proximity location where end user resides (e.g. on the façade of the user's house). The distribution fiber 60 is then drawn through the tapping window 61.

Then, the operator preferably fixes the distribution cable 6 to the outer casing 1 of the connection box 100, while the connection plate 5 is detached therefrom (step 402).

Figure 3A:
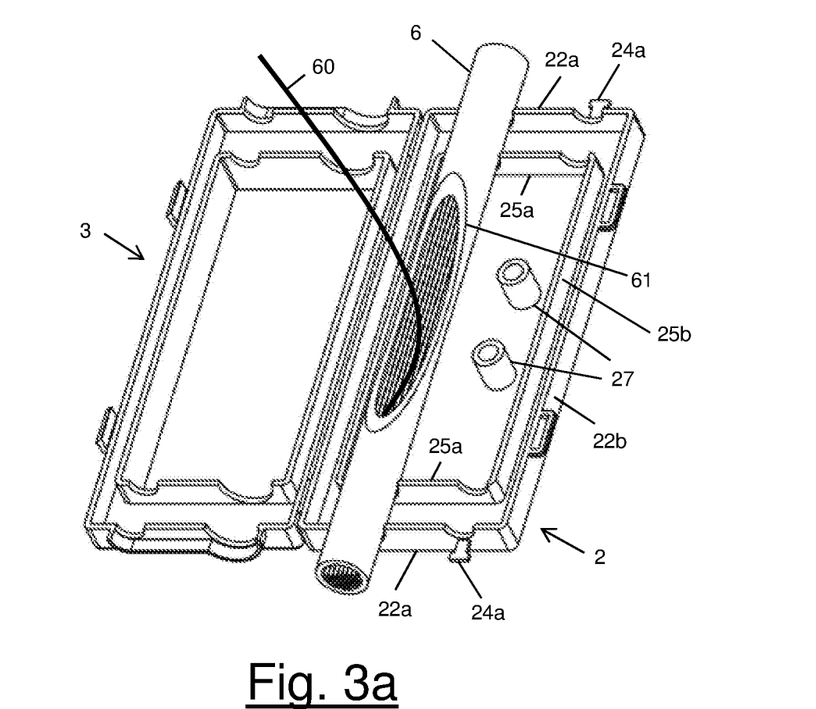
FIGS. 3a to 3f show different steps of the method for connecting two optical cables, in particular a distribution cable and a drop cable of an optical access network, using the connection box of FIGS. 1a, 1b, 2a, 2b.

For this purpose, the operator preferably arranges the distribution cable 6 in the base 2 parallel with the long sides 22b of the base 2, with the tapping window 61 completely contained within the inner walls 25a, 25b of the base 2 and facing upwardly, as schematically depicted in FIG. 3a. In order to enter and exit the base 2 of the outer casing 1, the distribution cable 6 engages the recesses 23 of the short sidewalls 22a of the base 2. In order to fix the distribution cable 6 to the base 2, the operator may use two collars, each one being wound about the distribution cable 6 and the tab 23a provided close to each recess 23.

The operator then preferably fixes an end of a drop cable 7 to the connection plate 5 (step 403), while the connection plate 5 is still detached from the outer casing 1.

Figure 3B:
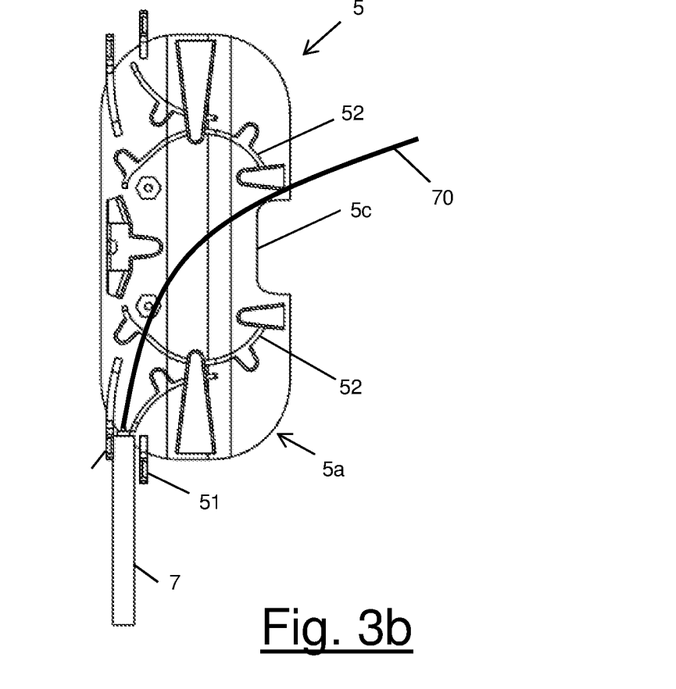

In particular, the operator preferably removes a length of the sheath of the drop cable 7 so as to free a corresponding length of a drop fiber 70. Then, the operator preferably fixes the end of the sheath of the drop cable 7 to the first surface 5a of the connection plate 5 by using anyone of the two pairs of protrusions 51 provided on the connection plate 5. Even more particularly, the operator chooses a pair of protrusions 51 and fits the end of the sheath of the drop cable 7 between them (as schematically depicted in FIG. 3b), while keeping the drop fiber 70 exiting from the end of the drop cable sheath on the first surface 5a of the connection plate 5. Then, the operator winds e.g. a collar about the protrusions 51 and the sheath of the drop cable 7 to secure the drop cable 7 to the connection plate 5.

It has to be noted that, at this stage, the operator may fix the drop cable 7 to anyone of the pairs of protrusions 51, without the need to take into account the direction from which the distribution fiber 60 exits the distribution cable 6.

Then, the operator preferably makes the drop fiber 70 pass from the first surface 5a to the second surface 5b of the connection plate 5 (step 404).

For this purpose, the operator preferably arranges the drop fiber 70 on the first surface 5a of the connection plate 5 according to anyone of the two alternative, curved paths defined by the curved guiding walls 52 and directing walls 54 and leading from the end of the sheath of the drop cable 7 to the fiber passage formed by the indentation 5c in the perimeter edge of the connection plate 5.

Figure 3C:
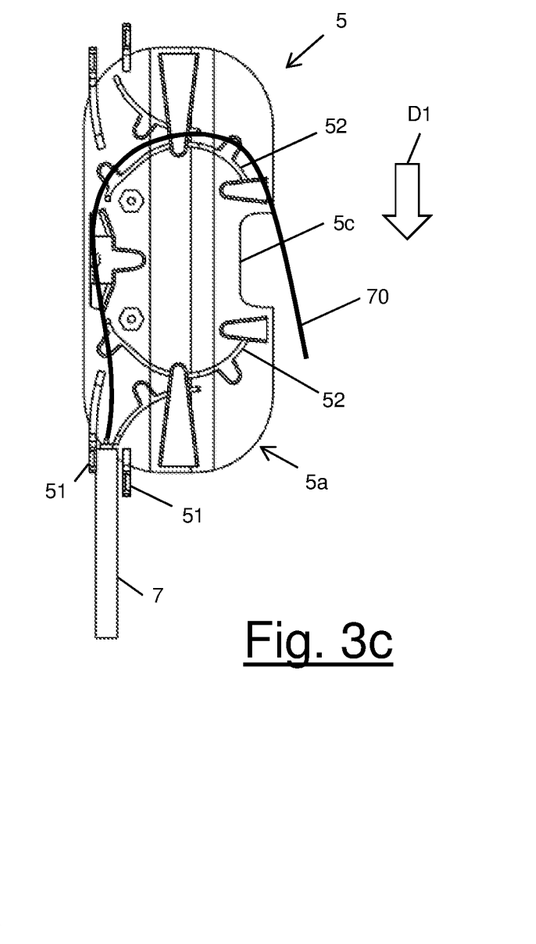
Figure 3D:
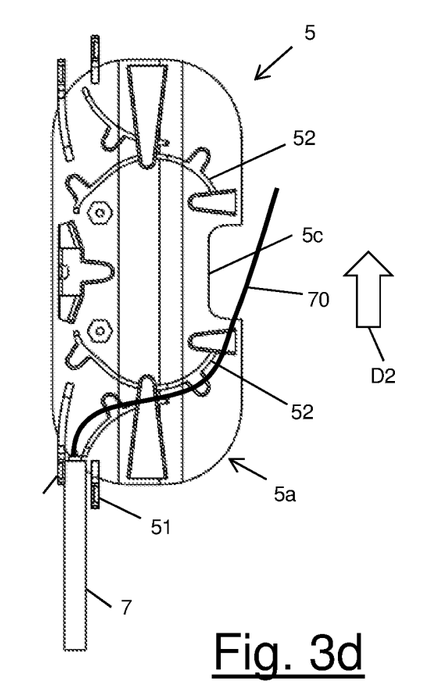

For instance, in the configuration shown in FIG. 3c, the operator makes the drop fiber 70 pass straight along the long side adjacent to the rounded corner where the end of the sheath of the drop cable 7 is fixed and then turn around the upper curved guiding wall 52 along a clockwise direction, so as to arrive to the indentation 5c from a first direction D1. Otherwise, as schematically depicted in FIG. 3d, the operator may make the drop fiber 70 turn towards the opposite long side of the connection plate 5 and then follow the lower curved guiding wall 52 along a counterclockwise direction, so as to arrive to the indentation 5c from a second direction D2 opposite to the direction D1.

If the end of the sheath of the drop cable 7 were fixed at the other round corner of the connection plate 5, it may be appreciated that the operator would have in any case the possibility to arrange the drop fiber 70 so as to reach the indentation 5c from anyone of the directions D1 and D2. In any case, the operator may advantageously choose the direction D1 or D2 from which the drop fiber 70 shall reach the fiber passage formed by the indentation 5c (and then the second surface 5b of the connection plate 5), depending on the direction from which the distribution fiber 60 exits the distribution cable 6.

Then, the operator preferably houses the connection plate 5—with the drop cable 7 fixed thereto as described above—in the outer casing 1 of the connection box (step 405).

Figure 3E:
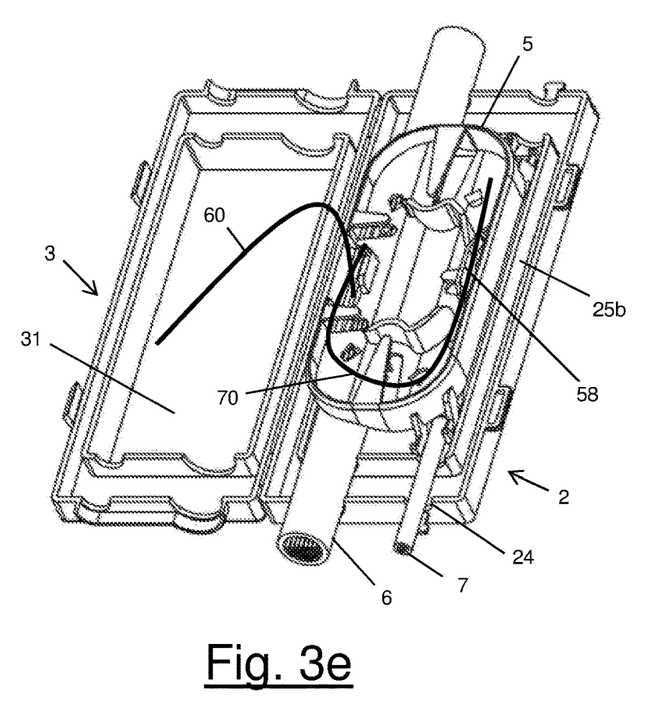

For this purpose, the operator preferably turns over the connection plate 5 so that its first surface 5a faces the bottom 21 of the base 2 and its second surface 5b faces upwardly. The operator then preferably pushes the connection plate 5 in the base 2—in particular, in the central chamber defined by the inner walls 25a, 25b—until the pillars 55 on the first surface 5a of the connection plate 5 fit into the hollow cylinders 27 of the base 2. This way, the connection plate 5 is completely contained within the central chamber of the base 2 and is fixed thereto, as shown in FIG. 3e. The operator may then temporarily lean the drop fiber 70 on the second surface 5b of the connection plate 5.

If the hollow cylinders 27 and pillars 55 are absent (as described above, such attaching members are optional), at step 405 the operator only arranges the connection plate 5 in the base 2. The connection plate 5 will be then blocked in the base 2 at the end of the installation procedure, when the cover 3 will be closed on the base 2.

While the operator inserts the connection plate 5 in the base 2 of the outer casing 1, she/he preferably keeps the distribution fiber 60 apart, e.g. she/he may temporarily lean it on the bottom 31 of the cover 3, as schematically depicted in FIG. 3e. When the connection plate 5 is housed within the base 2, the fiber passage formed by the indentation 5c in the perimeter edge of the connection plate 5 is located above the tapping window 61 of the distribution cable 6, from which the distribution fiber 60 exits the distribution cable 6. This allows the operator to bring also the distribution fiber 60 directly from the distribution cable 6 to the second surface 5b of the connection plate 5 through the fiber passage formed by the indentation 5c (step not shown in FIG. 4), as depicted in FIG. 3e.

As shown in FIG. 3e, the distribution fiber 60 and drop fiber 70 exit the fiber passage formed by the indentation 5c along opposite directions. This is achieved by choosing the proper arrangement of the drop fiber 70 between those shown in FIGS. 3c, 3d.

It may also be noticed that, in the configuration of FIG. 3e, the drop cable 7 enters the base 2 through one of the recesses 24 in the short sidewalls 22a of the base 2. Optionally, the operator may fix the drop cable 7 to the base 2, e.g. by winding a collar about the drop cable 7 and the tab 24a provided close to the recess 24.

Then, the operator preferably connects the distribution fiber 60 extracted from the distribution cable 6 to the drop fiber 70 extracted from the end of the sheath of the drop cable 7 (step 406). For this purpose, the operator preferably uses an optical connector 8, such as a mechanical splice or a fusion splice.

The operator then preferably arranges the optical connector 8 in the connector holder 58 provided on the second surface 5b of the connector plate 5 (step 407). As mentioned above, since the connector holder 58 keeps the optical connector 8 in an elevated position above the extra-length of the distribution fiber 60 and drop fiber 70, the optical connector 8 advantageously acts as a fiber retaining element.

Then, the extra-length of the fibers is arranged on the second surface 5b of the connection plate 5 (step 408). In particular, the operator preferably coils such fiber-extra length and arranges it in the peripheral area defined by the perimeter wall 56 and curved inner walls 57 provided on the second surface 5b of the connection plate 5.

Figure 3F:
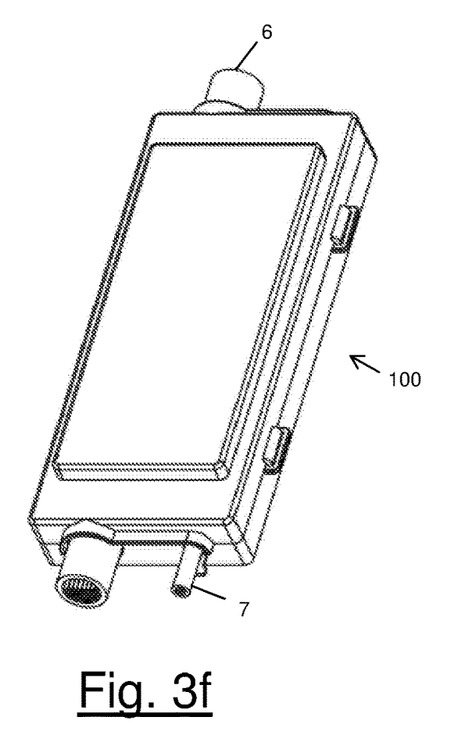

The operator finally closes the outer casing 1 (step 409) of the connection box 100, as schematically depicted in FIG. 3f. For this purpose, the operator preferably secures the cover 3 to the base 2, by means of the first securing members 28 and second securing members 38 provided on the base 2 and cover 3, respectively.

In case the sealing material is in the form of a preformed sealing member (e.g. a rubber preformed sealing member) conformed to fit in the trench 26, before securing the cover 3 to the base 2, the operator preferably fits the preformed sealing member in the trench 26, thereby providing a hermetically sealing against seepage and dust infiltration.

Accordingly, as illustrated in FIGS. 1a-3f, and 5, a connection box (100) for housing a connection between a first optical cable (6) and a second optical cable (7) at a mid-span position of the first optical cable (6) includes an outer casing (1) comprising a first fixing member (23a) configured to fix the first optical cable (6) to the outer casing (1) at the mid-span position; and a connection plate (5) detachable from the outer casing (1) and configured to be completely housed within the outer casing (1).

Figure 5:
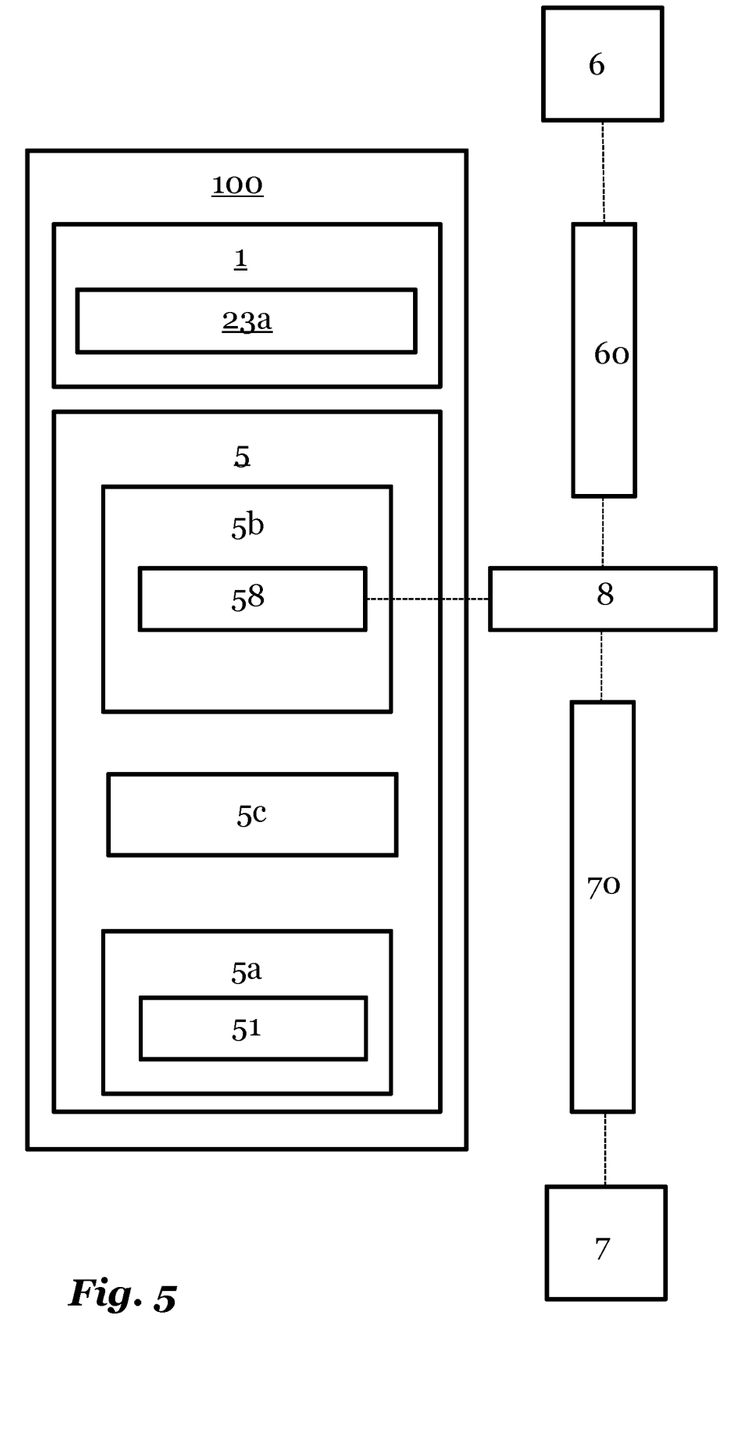
FIG. 5 is a schematic illustration of a connection box according to embodiments of the present invention described above.

The connection plate (5) comprises a first surface (5a) comprising a second fixing member (51) configured to fix an end of the second optical cable (7) to the connection plate (5), a second surface (5b) opposite to the first surface (5a) and comprising a connector holder (58) configured to hold an optical connector (8) between a first optical fiber (60) extracted from the first optical cable (6) at the mid-span position and a second optical fiber (70) extracted from the end of said second optical cable (7), and a perimeter edge exhibiting an indentation (5c) which forms a fiber passage configured to allow passage of the second optical fiber (70) from the first surface (5a) to the second surface (5b) of the connection plate (5).

The connection box 100 is advantageously suitable for façade installations and, at the same time, has a particularly reduced cost.

In the connection box 100, indeed, the components needed to hold the optical connector 8 (as well as those which guide the drop fiber 70 from the point where it exits the drop cable 7 to the point where the optical connector 8 is held and those for arranging the extra-length of distribution fiber 60 and drop fiber 70) are provided on the connection plate 5. The outer casing 1 does not comprise any tab or protrusion, except the fixing member(s) 23a for fixing the distribution cable 6 and the attaching members 27. Hence, the outer casing 1 may have a particularly simple structure with smooth surfaces (no tabs, protrusions, etc.).

On one hand, this implies that the outer casing 1 can be manufactured (e.g. by plastic molding) at a very reduced cost. Moreover, the connection box 100 may be provided to the operator with the connection plate 5 detached from the outer casing 1, hence substantially with no assembly cost. The overall cost of the connection box 100 is therefore reduced, which is particularly advantageous, since the connection box 100 is intended for a single end user who entirely bears its cost.

On the other hand, the absence of tabs, protrusions etc. from the surfaces of the outer casing 1 implies the absence of corresponding holes or apertures which would be inevitably formed during the manufacturing by molding. The absence of any hole or aperture on the surfaces of the outer casing 1, in combination with the fact that the connection plate 5 in use is completely housed within it, advantageously provides a box 100 which may be easily hermetically sealed against seepage and dust infiltration, and which is therefore particularly suitable for façade installation. Protection degrees from water and dust equal to IP-44 (International Protection) may be achieved by coupling the base 2 to the cover 3 in a hermetic way, with no need to provide any additional sealing component.

Besides, the operation of connecting the drop cable 7 to the distribution cable 6 using the connection box 100 is particularly operator-friendly, so that it may be carried out even by less experienced operators with a minimum risk of damaging the fibers.

In order to bring the drop fiber 70 from the point where it exits the drop cable 7 to the point where the optical connector 8 shall be held, indeed, the operator only has to make the drop fiber 70 pass from the first surface 5a to the second surface 5b of the connection plate 5 through the fiber passage formed by the indentation 5c in the perimeter edge of the connection plate 5. This is much easier than making the drop fiber 70 pass through perimetrically closed apertures or slits.

As to the distribution fiber 60, the fiber passage formed by the indentation 5c in the perimeter edge of the connection plate 5 advantageously allows to easily pass also this fiber directly above the second surface 5b of the connection plate 5, where the connection holder 58 is provided. This operation may be easily done after the connection plate 5 has been already fitted into the outer casing 1, with no need to make the distribution fiber 70 pass through any perimetrically closed apertures or slits.

The invention claimed is:

1. A connection box comprising:
an outer casing comprising a first fixing member configured to fix a first optical cable to the outer casing at a mid-span position; and
a connection plate detachable from the outer casing and configured to be completely housed within the outer casing, the connection plate comprising:
a first surface comprising a second fixing member configured to fix an end of a second optical cable to the connection plate,
a second surface opposite to the first surface, the second surface comprising a connector holder configured to hold an optical connector between a first optical fiber extracted from the first optical cable at the mid-span position and a second optical fiber extracted from the end of the second optical cable, and
a perimeter edge exhibiting an indentation which forms a fiber passage configured to allow passage of the second optical fiber from the first surface to the second surface of the connection plate, wherein the connection box is configured to house a connection between the first optical cable and the second optical cable at the mid-span position of the first optical cable.

2. The connection box according to claim 1, wherein the outer casing comprises a base and a cover.

3. The connection box according to claim 2, wherein the connection plate is configured to be completely housed within the base of the outer casing with the first surface facing the base.

4. The connection box according to claim 2, wherein the first surface of the connection plate comprises at least one first attaching member configured to attach the connection plate to the outer casing, and the base of the outer casing comprises at least one second attaching member configured to engage with the at least one first attaching member.

5. The connection box according to claim4, wherein the at least one first attaching member comprises at least one pillar, and the at least one second attaching member comprises at least one hollow cylinder configured to receive the at least one pillar.

6. The connection box according to claim 2, wherein the cover is configured to block the connection plate in the base, when the cover is closed onto the base.

7. The connection box according to claim 1, wherein the first surface of the connection plate comprises two second fixing members configured to fix the end of the second optical cable to the connection plate, the two second fixing members being arranged at two consecutive corners of the connection plate.

8. The connection box according to claim 1, wherein the first surface of the connection plate comprises at least one guiding wall configured to define two alternative fiber paths running over the first surface, from the second fixing member configured to fix the end of the second optical cable to the connection plate, to the fiber passage formed by the indentation in the perimeter edge of the connection plate.

9. The connection box according to claim 8, wherein the two alternative fiber paths are configured to guide the second optical fiber so that it reaches the fiber passage from anyone of two opposite directions.

10. The connection box according to claim 1, wherein the second surface of the connection plate comprises a peripheral area for receiving an extra-length of the first optical fiber and the second optical fiber.

11. The connection box according to claim 10, wherein the connector holder is arranged in an elevated position above a portion of the peripheral area for receiving the extra-length of the first optical fiber and the second optical fiber.

12. The connection box according to claim 1, wherein the outer casing comprises at least one third fixing member configured to fix the second optical cable to the outer casing, when the connection plate with the second optical cable fixed thereto is completely housed within the outer casing.

13. The connection box according to claim 1, wherein the outer casing is configured to be sealed against seepage and dust infiltration.

14. A method for connecting a first optical cable and a second optical cable at a mid-span position of the first optical cable, the method comprising:
   extracting a first optical fiber from the first optical cable at the mid-span position and fixing the first optical cable to an outer casing of a connection box at the mid-span position;
   fixing an end of the second optical cable to a first surface of a connection plate of the connection box, the connection plate being detached from the outer casing;
   making a second optical fiber extracted from the end of the second optical cable pass from the first surface of the connection plate to an opposite second surface of the connection plate through a fiber passage formed by an indentation of a perimeter edge of the connection plate and completely housing the connection plate in the outer casing of the connection box; and
   connecting the first optical fiber extracted from the first optical cable to the second optical fiber extracted from the end of the second optical cable with an optical connector and arranging the optical connector on the second surface of the connection plate.

15. The method according to claim 14, wherein the outer casing comprises a base and a cover.

16. The method according to claim 15, further comprising housing the connection plate completely housed within the base of the outer casing with the first surface facing the base.

17. An assembly comprising:
   a first optical cable;
   a second optical cable; and
   a connection box housing a connection between the first optical cable and the second optical cable at a mid-span position of the first optical cable, wherein the connection box comprises:
      an outer casing comprising a first fixing member configured to fix the first optical cable to the outer casing at the mid-span position; and
      a connection plate detachable from the outer casing and configured to be completely housed within the outer casing, the connection plate comprising:
         a first surface comprising a second fixing member configured to fix an end of the second optical cable to the connection plate,
         a second surface opposite to the first surface, the second surface comprising a connector holder configured to hold an optical connector between a first optical fiber extracted from the first optical cable at the mid-span position and a second optical fiber extracted from the end of the second optical cable, and
         a perimeter edge exhibiting an indentation which forms a fiber passage configured to allow passage of the second optical fiber from the first surface to the second surface of the connection plate.

18. The assembly according to claim 17, wherein the outer casing comprises a base and a cover, wherein the first surface of the connection plate comprises at least one first attaching member configured to attach the connection plate to the outer casing, and the base of the outer casing comprises at least one second attaching member configured to engage with the at least one first attaching member.

19. The assembly according to claim 17, wherein the first surface of the connection plate comprises at least one guiding wall configured to define two alternative fiber paths running over the first surface, from the second fixing member configured to fix the end of the second optical cable to the connection plate, to the fiber passage formed by the indentation in the perimeter edge of the connection plate.

20. The assembly according to claim 17, wherein the second surface of the connection plate comprises a peripheral area for receiving an extra-length of the first optical fiber and the second optical fiber.

21. The connection box according to claim 8, wherein the connection plate comprises a first sidewall aligned with a first guiding wall of the at least one guiding wall and a second sidewall aligned with a second guiding wall of the at least one guiding wall, the first sidewall being opposite to the second sidewall, the first sidewall being spaced from the first guiding wall by a first portion of the first surface, the second sidewall being spaced from the second guiding wall by a second portion of the first surface.

22. The connection box according to claim 21, wherein the second fixing member is disposed on the first sidewall.

* * * * *